March 22, 1960 H. A. LEITER 2,929,868

IMAGE CONVERTER

Filed Aug. 3, 1953

WITNESSES:

E. A. McCloskey

Charles F. Renz

INVENTOR

Howard A. Leiter.

BY

F. E. Browder

ATTORNEY

United States Patent Office 2,929,868

Patented Mar. 22, 1960

2,929,868

IMAGE CONVERTER

Howard A. Leiter, Pittsburgh, Pa., assignor to Westinghouse Electric Corporation, East Pittsburgh, Pa., a corporation of Pennsylvania Application August 3, 1953, Serial No. 371,754

16 Claims. (Cl. 178—6.8)

Figures 1, 2:
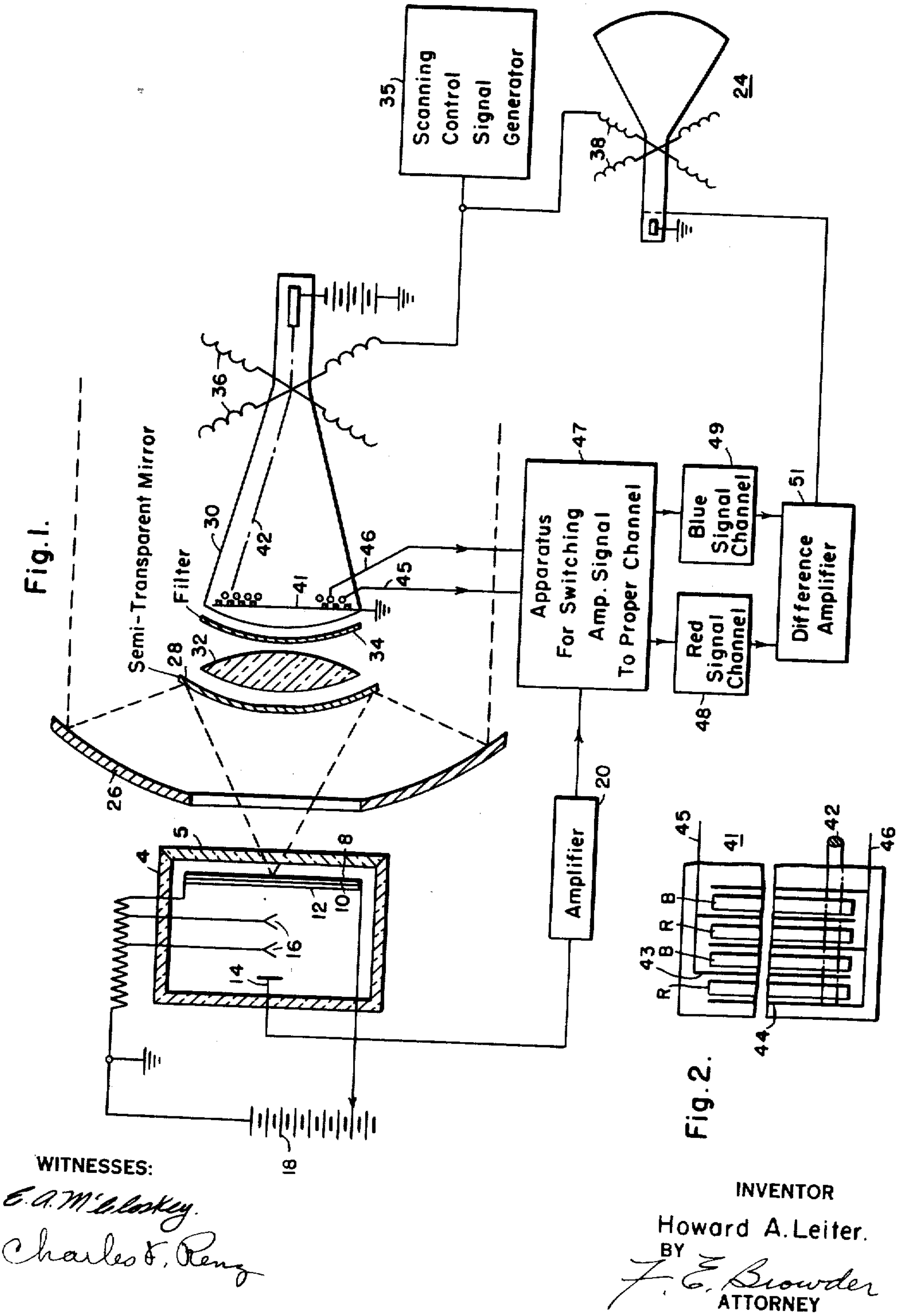

My invention relates to radiation detectors and, more particularly, to thermal image converters; that is to say, to devices which produce a replica in visible light of a space distribution of infrared radiation. One example of this is to reproduce as a visible light picture the infrared light radiated at night by natural objects, thus for example making it possible to "see," at night, by infrared light.

In accordance with prior art of which I am aware, thermal image converters have been suggested comprising a screen of low heat capacity capable of emitting more thermal electrons when heated by radiation, such as infrared, impinging thereon than when not so heated. Such a device is disclosed in an application of Max Garbuny and John S. Talbot, Serial No. 304,502, filed August 15, 1952, entitled "Thermal Image Converter" and assigned to the same assignee as the present invention. While such a device is valuable for some purposes, in other situations the improvement of that arrangement which I here describe will be desirable.

The operation of the above-mentioned arrangement depends upon the fact that the electron emissivity of certain photoelectric materials increases with temperature so that when a heat-radiation image (i.e. an infrared picture) is focussed on a thin photoelectric screen the electron-emissivity of the latter will vary from point-to-point of its surface, in correspondence with the space-distribution of the thermal radiation. It may thus be considered that a temperature-image which is a replica of the infrared picture has been produced on the photoelectric screen. When the screen is scanned with a spot of light, the electron-emissivity varies point-by-point with the temperature image and is made to vary (i.e. modulate) a current with time in the same way that the point-by-point electrical variations on the image screen of a television pickup tube modulate its output current as it is scanned by an electron beam. The time-modulated current of the Garbuny and Talbot tube reproduces a light picture on a kinescope screen in the same way as does the output current of the television pickup tube, and thus paints on the kinescope screen a replica of the thermal picture.

While the Garbuny and Talbot arrangement is satisfactory for many purposes, difficulty arises in others from nonuniformity of the photoelectric surface. In accordance with my present invention, I eliminate this difficulty by making use of the fact that while photoelectric-emissivity of many photoelectric materials in response to red or other long wave-length radiation increases with temperature, electron-emissivity in response to blue or other short-wave-length radiation is insensitive to temperature changes or, in some cases, actually decreases with temperature rise. I take advantage of this fact by a double-scanning of the photoelectric surface, alternately with longer and with shorter wave-length beams, and make the kinescope image a representation of the difference between the electron-emission of the screen excited by the respective beams. The difference emission is closely responsive to the temperature variations over the photoelectric surface, but unlike the Garbuny and Talbot arrangement, discriminates against inherent nonuniformities of sensitivity.

It is, accordingly, an object of my invention to produce an improved thermal image converter.

Another object of my invention is to provide an improved "phothermionic" image converter employing a combination of thermionic and photoemissive effects.

Another object of my invention is to produce a thermal image converter in which nonuniformities of the photoelectric screen are compensated for.

An ancillary object of my invention is to provide a novel system capable of precise response to temperature variations of its emissive surface.

Still another object of my invention is to provide an electrical device with an output circuit for a thermal image converter which is capable of rapidly switching the response to either one of two types of scanning light signal.

The term "phothermionic" image converter refers to a device for reproducing an image wherein both photoemissive and thermionic effects are employed.

The invention with respect to both the organization and the operation thereof, together with other objects and advantages may be best understood from the following description of specific embodiments when read in connection with the accompanying drawings, in which:

Figure 1 is a schematic showing of a phothermionic image converter built in accordance with one embodiment of my invention; and Fig. 2 is a schematic showing in larger scale of a section of the screen of a cathode-ray tube forming a part of Fig. 1.

In accordance with my invention, the pickup tube for the infrared image comprises a vacuum-tight envelope 4 having a transparent wall 5. Inside the envelope 4, there is a photoelectric screen 8 comprising a supporting sheet 10 of low heat capacity which is transparent to certain wave lengths of light but capable of absorbing thermal radiation. Coated on the supporting sheet 10 is a layer of photoelectric material 12, such as cesium-antimony, which has a different temperature coefficient of electron-emissivity for long-wave radiation than for shorter-wave radiation. It is also possible in accordance with another embodiment of my invention to employ an isolated sheet of photoelectric material covered with a film of infrared absorbing material such as gold black, the chief requirements of the screen 8 being that it have low heat capacity, that it be photoelectrically responsive in the manner just described and that it be capable of absorbing thermal radiation. Also, inside of the envelope, there is provided a collector electrode 14 for receiving electrons either directly or indirectly from the photoelectric surface 12.

In accordance with one embodiment of my invention, it may be desirable to employ secondary electron amplification, as by the use of electron multiplier electrodes 16, two of which electrodes are shown in the drawing. These two multiplier electrodes 16 are, of course, representative of a larger number of such electrodes which would probably be employed in practice. A source of potential 18 is connected between the photoelectric screen 8 and the dynodes 16 of the electron multiplier so as to cause electrons to be accelerated from the photoelectric screen 8 toward the dynode electrodes 16.

Means are provided for focusing an infrared or thermal image onto the photoelectric screen 8. This means may comprise any of several known types of focusing apparatus such as a Cassegrainian telescope collecting mirror 26 and a semi-transparent mirror 28 having the characteristic of high reflectivity to wave lengths longer than the visible and at the same time high transparency to light of visible wave lengths. The semi-transparent mirror 28 is located with respect to the Cassegrainian telescope mirror 26 so as to reflect the infrared radiation, which is focused by the Cassegrainian telescope reflector 26, onto the photoelectric screen 12.

On the opposite side of the semi-transparent mirror 28 from the photoelectric screen 8, there is provided an auxiliary kinescope 30 adapted to produce a light scan on the screen thereof. The auxiliary kinescope 30 is directed toward the semi-transparent mirror 28 and an optical system 32 is provided between the screen of the auxiliary kinescope 30 and the semi-transparent mirror 28 for focusing an image of the kinescope screen onto the photoelectric screen 8. In accordance with one embodiment of my invention, a filter 34 may also be provided in front of the screen of the auxiliary kinescope 30 for filtering out light radiation above a predetermined frequency.

A scanning control signal generator 35 is provided to supply energy to the deflection coils 36, 38 (or, alternatively, deflection electrodes) of the auxiliary kinescope 30 and the viewing kinescope 24, respectively.

As is shown in more detail in Fig. 2, the screen 41 of tube 30 comprises alternate strips R and B of phosphors which respectively emit radiation of different wavelengths, e.g., red light and blue light, when scanned by electrons of the scanning beam 42 of tube 30 in a direction transverse to the long dimension of the strips R and B. The phosphors have preferably the same decay characteristics (or else must be compensated for by circuit means if possible) and as short decay times as possible in order to obtain good resolution. The phosphor strips are preferably so dimensioned and so spaced that it is possible to cover with one red and one blue scanning light spot the smallest resolvable element of the photoelectric screen 8 which can be reproduced on the viewing kinescope 24. It is understood that improved resolution results if one element of the infrared image is scanned by more than one red-blue pair of light pulses. In front of the spaces separating the strips are positioned two sets of bars 43 and 44, respectively connected to inleads 45 and 46 which are sealed through the wall of kinescope 30. As the scanning beam 42 is deflected across the screen 41 by the scanning generator 35, the phosphor strips R and B alternately emit spots of red and blue light. The beam 42 is preferably made elliptical (or, ideally, rectangular) in cross-section so that, the beam may be of maximum area and yet in its passage, completely leave one strip before its leading edge strikes the adjacent one. The optical system 32 focuses the successive red and blue spots on the photoelectric layer 12 so closely adjacent elements of area are illuminated successively by light of long (red) wave lengths and light of short (blue) wave lengths.

After leaving a red strip R the scanning beam 42 strikes one of the bars 43 and produces a negative voltage pulse on the in-lead 45; and after leaving a blue strip B a negative pulse is impressed similarly, on in-lead 46.

These pulses from in-leads 45 and 46 are applied to a switching circuit 47 which may take any of the well known forms; such as, for example are to be found in vol. 19, Waveforms, M.I.T. Radiation Laboratory Series, McGraw-Hill Book Co. or in Fink, Television Engineering, chap. 9, McGraw-Hill Book Co. This circuit acts on the signals from the amplifier 20 to separate them into two trains of pulses displaced in time with each other and corresponding to the action of the red and the blue scanning light spots incident on the photo-sensitive surface 12.

The separated signals from the switching circuit 47 are directed into the red signal channel 48 and the blue signal channel 49. In these channels circuits may be included for compensation of the differences in phosphor decay characteristics. In addition a delay line incorporated in the channel of the initial pulse of a red-blue pulse pair facilitates comparison of the two pulses. This is accomplished by introducing the two pulses, the first of which is delayed by a certain amount, e.g. an amount equal to the width of the pulse, into a difference-amplifier 51, a circuit whose output is representative of the difference between the two input signals. This difference of the red and the blue signals from small adjacent elemental areas is applied to modulate the grid of the viewing kinescope tube 24.

The operation of the apparatus shown in Fig. 1 is substantially as follows: An infrared image of terrain, for example, is focused onto the photoelectric screen 8 by the Cassegrainian telescope reflector 26 and the semi-transparent mirror 28. The infrared image impinging on the photoelectric screen 8 heats certain elemental areas of the photoelectric layer 12, thereby forming a temperature image corresponding to the temperature pattern of the observed scene. The elemental areas which have been heated now have electrons with higher average kinetic energies than the average energies of the electrons in the unheated areas of the photoelectric surface 12. Therefore, red light photons, which impinge, point-by-point, on elemental areas of photoelectric surface 12 with frequencies higher than the threshold frequency of the photoelectric material will cause the ejection of more electrons from the areas of the photoelectric layer 12 which have been heated by the thermal radiation from the unheated areas. On the other hand, the blue-light photons incident on substantially the same respective areas cause ejection of a number of electrons which corresponds to the specific emissivity of the area, but not to its temperature.

The signal from the pickup electrode 14 is passed through the amplifier 20 to the switching circuit 47. Thus when the scanning beam 42 strikes a bar 44 just before it strikes a red phosphor strip R, the pulse impressed on the in-lead 46 operates the switching circuit 47 so that the red signal channel 48 is open and the blue signal channel 49 is closed. If the delay-line technique is used in the red channel, the red signal does not reach the difference amplifier 51 until the switch in response to the pulse from the in-lead 45, resulting from the scanning electron beam 42 striking the bar 43 after sweeping across the red phosphor strip, operates to close the red signal channel and open the blue signal channel. Thus the red signal and the blue signal arrive at the input to the difference-amplifier 51 at the same time. The resulting output signal from the difference amplifier 51 is then applied to the grid of the viewing kinescope 24 which derives its sweeps from the scanning control signal generator 35 which, also drives the sweeps of scanning tube 30.

If no thermal image is impressed on the photosensitive surface 12, the viewing kinescope 24 shows a pattern of illumination which varies according to the inherent differences between red sensitivity and blue sensitivity and is substantially uniform as long as the scanned elemental areas are sufficiently small compared with the inherent variation in uniformity of sensitivity of the surface.

However, when a thermal image is impressed on the photosensitive surface 12, the increase in red sensitivity compared with the blue results in a viewing kinescope 24 picture portraying the thermal image free from the variations imposed by the inherent sensitivity variations.

In accordance with a preferred embodiment of my invention, the heat capacity of the photoelectric screen 8 is chosen so that most of the heat from an elemental area of the screen is dissipated in a period approximately equal to the time required for the scanning of the screen 8 by the light spot. Thus, when infrared radiation impinges on an elemental area of the screen 8, it continues to heat that elemental area during the entire scan or frame time of the light spot. There is thus produced a "storing effect" whereby the energy from the infrared is stored up over a complete scanning cycle but is emitted in the form of electron kinetic energy only during that short interval of time when the scanning light spot impinges on that elemental area.

While I have described the photoelectric surface as scanned by a light spot, the expedient of alternately flooding a photoelectric surface with light beams for which the surface has different temperature coefficients of emissivity may be used to detect temperature variations with time of a uniformly heated unscanned surface, the emission currents for the two respective lights being bucked against each other to give a difference output. While I have described the two scanning beams on my apparatus as synchronized, the arrangement is operative without such synchronization.

Although I have shown and described specific embodiments of my invention, I am aware that other modifications thereof are possible. My invention, therefore, is not to be restricted except insofar as is necessitated by the prior art and the spirit of the invention.

I claim as my invention:

1. A system for producing a visible replica of an image produced by infrared radiation comprising means for projecting said radiation onto a member having a surface which emits electrons in response to incidence of radiation and has a substantial temperature coefficient of electron emissivity for radiation of a first wave-length and a substantially different temperature coefficient of electron emissivity for radiation of a second wave-length, means for projecting onto said surface the image of a screen on which a scanning beam generates a light spot, said screen comprising two sets of alternately spaced strips which respectively emit light of said first wave-length and said second wavelength upon incidence of said beam, means to derive a current corresponding to the difference of electron emission from adjacent elemental areas of said surface resulting from the projection thereon of the image of said light spot, and means to produce an output picture whose intensity, at points corresponding to the position of said light spot image on said surface, is controlled in accordance with said current.

2. A system for producing a visible replica of an image produced by infrared radiation comprising means for projecting said radiation onto a member having a surface which emits electrons in response to incidence of radiation and has a substantial temperature coefficient of electron emissivity for radiation of a first wave-length and a substantially different temperature coefficient of electron emissivity for radiation of a second wave-length, means for projecting onto said surface the image of a screen on which a scanning beam generates a light spot, said screen comprising two sets of alternately spaced strips which respectively emit light of said first wave-length and said second wave-length upon incidence of said beam, means to derive a current corresponding to the difference of electron emission from adjacent elemental areas of said surface resulting from the projection theeron of the image of said light spot, and a kinescope having the intensity of its scanning beam controlled in accordance with said current.

3. A system for producing a visible replica of an image produced by infrared radiation comprising means for projecting said radiation onto a member having a surface which emits electrons in response to incidence of radiation and has a substantial temperature coefficient of electron emissivity for radiation of a first wave-length and a substantially different temperature coefficient of electron emissivity for radiation of a second wave-length, means for projecting onto said surface the image of a screen on which a scanning beam generates a light spot, said screen comprising two sets of alternately spaced strips which respectively emit light of said first wave-length and said second wave-length upon incidence of said beam, two channels respectively rendered conductive when said beam strikes strips in one or the other of said sets of strips and energized by the electron-emission from said surface with their outputs opposed, and means to produce an output picture whose intensity, at points corresponding to the position of said light spot image on said surface, is controlled in accordance with the resultant of said opposed outputs.

4. A system for producing a visible replica of an image produced by infrared radiation comprising means for projecting said radiation onto a member having a surface which emits electrons in response to incidence of radiation and has a substantial temperature coefficient of electron emissivity for radiation of a first wave-length and a substantially different temperature coefficient of electron emissivity for radiation of a second wave-length, means for projecting onto said surface the image of a screen on which a scanning beam generates a light spot, said screen comprising two sets of alternately spaced strips which respectively emit light of said first wave-length and said second wavelength upon incidence of said beam, a first conductor struck by said beam when it starts incidence with a strip of one of said sets and a second conductor struck by said beam when it starts incidence with a strip of the other of said sets, a first electrical discharge device rendered conductive to the electron emission from said surface by incidence of said beam on said first conductor and a second electrical discharge device rendered conductive to the electron emission from said surface by incidence of said beam on said second conductor, means to derive an output current corresponding to the difference of the outputs of said first and second electrical discharge devices, and a picture reproducing means having an output screen scanned in synchronism with said scanning beam and having its light intensity governed by said output current.

5. A system for producing a visible replica of an image produced by infrared radiation comprising means for projecting said radiation onto a member having a photoelectrically emissive surface which has a substantially different temperature coefficient of electron-emissivity for red light than for blue light, means for projecting onto said surface the image of a screen comprising two sets of alternate strips which respectively emit a spot of red light and a spot of blue light when a first scanning beam moves across them, means to derive a current corresponding to the difference of the electron-emission from the elementary areas of said surface on which said spots are projected, and a kinescope having a second scanning beam synchronized with said first scanning beam and controlled in intensity of impact on its picture screen in accordance with said current.

6. A system for producing a visible replica of an image produced by infrared radiation comprising means for projecting said radiation onto a member having a photoelectrically emissive surface which has a substantially different temperature coefficient of electron-emissivity for red light than for blue light, means for projecting onto said surface the image of a screen comprising two sets of alternate strips which respectively emit a spot of red light and a spot of blue light when a first scanning beam moves across them, means to derive voltage pulses when said first scanning beam passes from incidence with one of said sets to the other of said sets, a difference amplifier energized in accordance with the electron-emission from said emissive surface and keyed by said pulses to produce an output current corresponding to the difference of the electron-emission generated on said emissive surface by spots of red light from that generated by spots of blue light, and a kinescope having a second scanning beam synchronized with said first scanning beam and modulated in intensity in accordance with said current.

7. A system for producing a visible replica of a first radiation image comprising means for projecting said field onto a member having a surface which emits electrons in response to a second radiation in an amount which varies at one rate with temperature and in response to a third radiation in an amount which varies at another rate with temperature, means for scanning said surface with a spot which alternately comprises said second radiation and said third radiation, means for deriving an output current which corresponds at any instant to the difference in the electron-emission from said surface due to said spot of said second radiation and said spot of said third radiation, and means for producing an output picture whose intensity at points corresponding to the position of said spot on said surface is controlled in accordance with said output current.

8. In combination, a radiation responsive device comprising a surface of material which emits electrons in response to incidence of radiation of a first wave-length with a substantial temperature coefficient of electron-emissivity and with a different temperature coefficient of electron-emissivity in response to radiation of a second wave-length, means to scan said surface with a spot of radiation which alternates between said first wavelength and said second wave-length, and means for deriving an output-current which corresponds to the difference in the electron emission from adjacent areas of said surface due to said radiation of said first wave-length and that due to said radiation of said second wave-length.

9. In combination, a radiation responsive device comprising a surface of material which emits electrons in response to incidence of radiation of a first wave-length with a substantial temperature coefficient of electron-emissivity and with a different temperature coefficient of electron emissivity in response to radiation of a second wave length, means to irradiate said surface with radiation which alternates between said first wave-length and said second wave-length, and means for deriving an output current which corresponds to the difference in the electron emission from adjacent areas of said surface due to said radiation of said first wave-length and that due to said radiation of said second wave-length.

10. In combination, a radiation responsive device comprising a surface of material which emits electrons in response to incidence of radiation of a first wave-length with a substantial temperature coefficient of electron-emissivity and with a different temperature coefficient of electron-emissivity in response to radiation of a second wave-length, means for projecting onto said surface the image of a screen on which a scanning beam generates a light spot, said screen comprising two sets of alternately spaced strips which respectively emit light of said first wave-length and said second wave-length upon incidence of said beam, and means to derive a current corresponding to the difference of electron emission from adjacent elementary areas of said surface resulting from the projection thereon of the image of said light spot.

11. A system for producing a visible replica of a first radiation image comprising means for projecting said image onto a member having a surface which emits electrons in response to a second radiation in an amount which varies at one rate with temperature and in response to a third radiation in an amount which varies at another rate with temperature, said surface being cesium antimony, means for scanning said surface with a spot which alternately comprises said second radiation and said third radiation, means for deriving an output current which corresponds at any instant to the difference in the electron-emission from said surface due to said spot of said second radiation and said spot of said third radiation, and means for producing an output picture whose intensity, at points corresponding to the position of said spot on said surface, is controlled in accordance with said output current.

12. A system for producing a visible replica of an image produced by infrared radiation comprising means for projecting said radiation onto a member having a surface which emits electrons in response to incidence of radiation and has a substantial temperature coefficient of electron emissivity for radiation of a first wave-length and a substantially different temperature coefficient of electron emissivity for radiation of a second wave-length, said surface being cesium antimony, means for projecting onto said surface the image of a screen on which a scanning beam generates a light spot, said screen comprising two sets of alternately spaced strips which respectively emit light of said first wave-length and said second wave-length upon incidence of said beam, means to derive a current corresponding to the difference of electron emission from adjacent elemental areas of said surface resulting from the projection thereon of the image of said light spot, and means to produce an output picture whose intensity, at points corresponding to the position of said light spot image on said surface, is controlled in accordance with said current.

13. A system for producing a visible replica of an image produced by infrared radiation comprising means for projecting said radiation onto a member having a surface which emits electrons in response to incidence of radiation and has a substantial temperature coefficient of electron emissivity for radiation of a first wave-length and a substantially different temperature coefficient of electron emissivity for radiation of a second wave-length, said surface being cesium antimony, means for projecting onto said surface the image of a screen on which a scanning beam generates a light spot, said screen comprising two sets of alternately spaced strips which respectively emit light of said first wave-length and said second wave-length upon incidence of said beam, means to derive a current corresponding to the difference of electron emission from adjacent elemental areas of said surface resulting from the projection thereon of the image of said light spot, and a kinescope having the intensity of its scanning beam controlled in accordance with said current.

14. A system for producing a visible replica of an image produced by infrared radiation comprising means for projecting said radiation onto a member having a photoelectrically emissive surface which has a substantially different temperature coefficient of electron-emissivity for red light than for blue light, said photoelectrically emissive surface being cesium antimony, means for projecting onto said surface the image of a screen comprising two sets of alternate strips which respectively emit a spot of red light and a spot of blue light when a first scanning beam moves across them, means to derive voltage pulses when said first scanning beam passes from incidence with one of said sets to the other, a difference amplifier energized in accordance with the electron-emission from said emissive surface and keyed by said pulses to produce an output current corresponding to the difference of the electron-emission generated on said emissive surface by spots of red light from that generated by spots of blue light, and a kinescope having a second scanning beam synchronized with said first scanning beam and modulated in intensity in accordance with said current.

15. In combination, a radiation responsive device comprising a surface of material which emits electrons in response to incidence of radiation of a first wave-length with a substantial temperature coefficient of electron-emissivity and with a different temperature coefficient of electron-emissivity in response to radiation of a second wave-length, said material being cesium antimony, means to scan said surface with a spot of radiation which alternates between said first wave-length and said second wave-length, and means for deriving an output-current which corresponds to the difference in the electron emission from adjacent areas of said surface due to said radiation of said first wave-length and that due to said radiation of said second wave-length.

16. In combination, a radiation responsive device comprising a surface of material which emits electrons in response to incidence of radiation of a first wave-length with a substantial temperature coefficient of electron-emissivity and with a different temperature coefficient of electron emissivity in response to radiation of a second wave-length, said material being cesium antimony, means for projecting onto said surface the image of a screen on which a scanning beam generates a light spot, said screen comprising two sets of alternately spaced strips which respectively emit light of said first wave-length and said second wave-length upon incidence of said beam, and means to derive a current corresponding to the difference of electron emission from adjacent elementary areas of said surface resulting from the projection thereon of the image of said light spot.

References Cited in the file of this patent

UNITED STATES PATENTS

| | | |
|---|---|---|
| 1,948,941 | Olpin | Feb. 27, 1934 |
| 2,150,159 | Gray | Mar. 14, 1939 |

| | | |
|---|---|---|
| 2,529,485 | Chew | Nov. 14, 1950 |
| 2,619,531 | Weighton | Nov. 25, 1952 |
| 2,631,259 | Nicoll | Mar. 10, 1953 |

FOREIGN PATENTS

| | | |
|---|---|---|
| 661,162 | Great Britain | Nov. 21, 1951 |

OTHER REFERENCES

Golay: A Pneumatic Infra Red Detector, Review of Scientific Instruments (May 1947), v. 18, pp. 357–362.

Morton et al.: An Infrared Image Tube and Its Military Applications, RCA Review (September 1946), v. 7, pp. 385–413 (reprint in 343–17).

Goerlich: Measurements on Composite Photo Cathodes Zeit fur Physik, v. 109, pages 374–386.